(12) United States Patent
Scheu et al.

(10) Patent No.: US 9,751,420 B2
(45) Date of Patent: Sep. 5, 2017

(54) CHARGING DEVICE

(75) Inventors: Michael Scheu, Tuebingen (DE); Tobias Mueller, Schwieberdingen (DE)

(73) Assignee: DR. ING. H.C.F. PORSCHE AKTIENGESELLSCHAFT, Stuttgart (DE)

(*) Notice: Subject to any disclaimer, the term of this patent is extended or adjusted under 35 U.S.C. 154(b) by 158 days.

(21) Appl. No.: 13/825,385

(22) PCT Filed: Oct. 18, 2011

(86) PCT No.: PCT/EP2011/005215
§ 371 (c)(1),
(2), (4) Date: Mar. 21, 2013

(87) PCT Pub. No.: WO2012/059176
PCT Pub. Date: May 10, 2012

(65) Prior Publication Data
US 2013/0175991 A1    Jul. 11, 2013

(30) Foreign Application Priority Data

Nov. 4, 2010  (DE) .................. 10 2010 060 341

(51) Int. Cl.
*H02J 7/00* (2006.01)
*B60L 11/18* (2006.01)
(Continued)

(52) U.S. Cl.
CPC ............ *B60L 11/1838* (2013.01); *B60L 7/18* (2013.01); *B60L 11/1824* (2013.01); *B60L 11/1861* (2013.01); *G01M 17/0074* (2013.01);

*Y02T 10/7005* (2013.01); *Y02T 10/705* (2013.01); *Y02T 10/7044* (2013.01);
(Continued)

(58) Field of Classification Search
USPC .................................................. 320/104, 109
See application file for complete search history.

(56) References Cited

U.S. PATENT DOCUMENTS 4,055,996 A * 11/1977 Dinkelacker et al. ...... 73/116.06
5,294,221 A *  3/1994 Eller et al. ...................... 410/30
(Continued)

FOREIGN PATENT DOCUMENTS

DE    88 13 662        4/1989
EP    0 246 595       11/1987
(Continued)

OTHER PUBLICATIONS

German Search Report dated Feb. 14, 2012.
International Search Report dated May 7, 2012.

*Primary Examiner* — Samuel Berhanu
(74) *Attorney, Agent, or Firm* — Gerald E. Hespos; Michael J. Porco; Matthew T. Hespos

(57) ABSTRACT

The invention relates to a roller test bench-type charging device comprising driveable rollers for charging an electric energy store in a motor vehicle, in particular in an electric or hybrid vehicle, such that the energy store of a motor vehicle which is placed on said device and the wheels of an axle of which are connected to the rollers in a force-transmitting manner is charged via the motor vehicle alternator or a motor vehicle electric motor designed as a generator. A universal charging device can thereby be provided.

5 Claims, 1 Drawing Sheet

(51) Int. Cl.
*B60L 7/18* (2006.01)
*G01M 17/007* (2006.01)
(52) U.S. Cl.
CPC .......... *Y02T 10/7072* (2013.01); *Y02T 90/121* (2013.01); *Y02T 90/128* (2013.01); *Y02T 90/14* (2013.01); *Y02T 90/163* (2013.01)

(56) References Cited

U.S. PATENT DOCUMENTS

| | | | |
|---|---|---|---|
| 6,021,365 A * | 2/2000 | Ishii et al. | 701/22 |
| 2008/0297109 A1 | 12/2008 | Sandberg et al. | |
| 2009/0167096 A1 | 7/2009 | Sosnowski et al. | |

FOREIGN PATENT DOCUMENTS

| | | |
|---|---|---|
| JP | 8-334439 | 12/1996 |
| JP | 2007-116755 | 5/2007 |
| JP | 2007-139527 | 6/2007 |

* cited by examiner

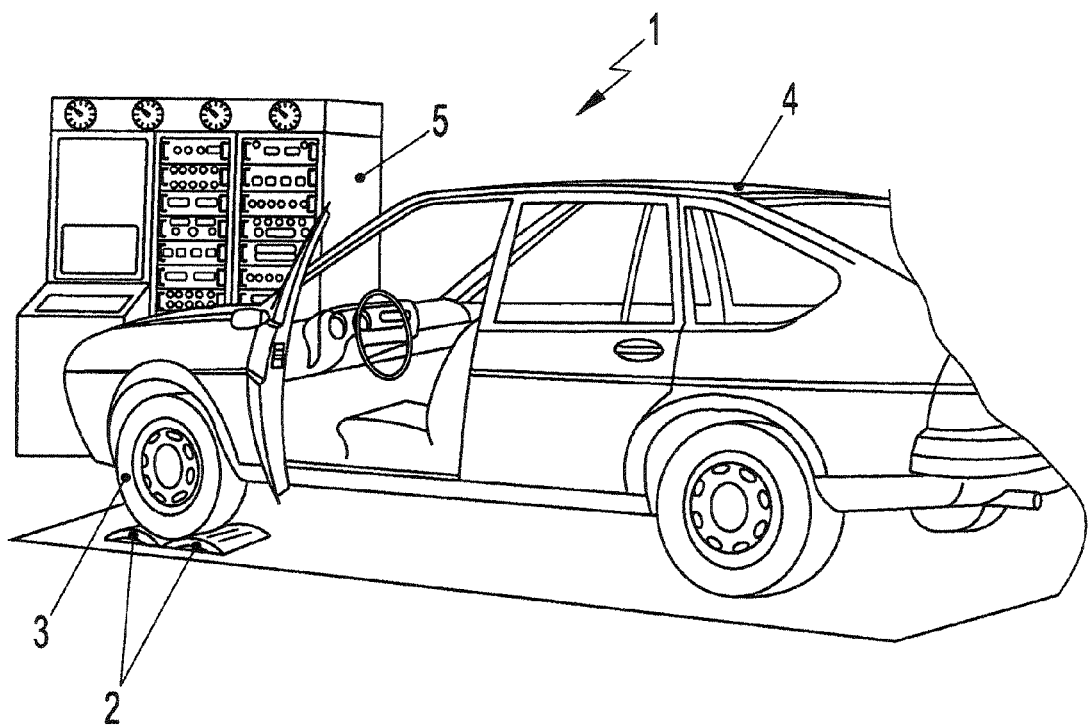

CHARGING DEVICE

BACKGROUND OF THE INVENTION

1. Field of the Invention

The present invention relates to a charging apparatus in the style of a roller test rig. Furthermore, the invention relates to a method for charging an electrical energy store in a motor vehicle.

2. Description of the Related Art

Increasing the sharpening environmental consciousness means that electric vehicles are shifting toward the focus of interest on account of their low pollutant emission. However, a disadvantage of all electric vehicles known to date is that they fill up with electrical power, and hence can be charged, only at charging stations provided specifically for this purpose. At the charging stations, this always requires the correct electrical connection to be observed in order to prevent damage. A particular disadvantage with the known charging stations and the known charging apparatuses is the need for additional electrical parts or components in the electric vehicle, such as a charger and a jack. In addition, problems arise as a result of different charging interfaces and standardizations.

The present invention is therefore concerned with the problem of specifying a charging apparatus which can be used to charge an electrical energy store in a motor vehicle, for example, an electric or hybrid vehicle, irrespective of the standard used for the charging interface and additional charging-related electrical parts or components.

SUMMARY OF THE INVENTION

The present invention is based on the general concept of designing a charging apparatus for charging an electrical energy store in a motor vehicle, for example in an electric or hybrid vehicle, in the style of a roller test rig, with the result that charging the energy store merely requires the respective motor vehicle to be driven onto the roller test rig, with driven rollers on the charging apparatus then prompting a generator or an electric motor in the motor vehicle that acts as an generator to produce the required charging voltage. To this end, the motor vehicle has its vehicle wheels on one axle connected to the rollers so as to transmit force, with the rollers on the charging apparatus in the form of a roller test rig being driven, with the result that the electrical energy store in the motor vehicle can be charged easily via the drive of the rollers and hence via the generator or the electric motor in the motor vehicle. In comparison with charging stations and charging apparatuses to date, the charging apparatus in the form of a roller test rig therefore allows charging irrespective of vehicle and, as a result, can be used particularly flexibly.

In one advantageous development of the solution according to the invention, a sensing/control device is provided which senses a maximum regenerative power for the generator or for the electric motor and actuates or regulates a drive device for driving the rollers of the charging apparatus such that said drive device drives the rollers in accordance with the optimum regenerative power of the generator or electric motor while observing the present limit values for the electrical energy store. Every generator or every electric motor operating as a generator yields an optimum electrical power in a particular rotation speed range, but said optimum electrical power is individual from the rotation speed and individual from the respective generator or the respective electric motor. In this case, the sensing/control device provided according to the invention is capable of inferring the respective generator used or the respective electric motor used, for example on the basis of the vehicle type, and, as a result, driving the rollers such that the generator or the electric motor operates in the optimum regenerative range, that is to say in the optimum rotation speed range. This makes it possible to achieve particularly fast and effective charging of the electrical energy store in the motor vehicle.

In a further advantageous embodiment of the solution according to the invention, the charging apparatus has a retaining device for fixing the motor vehicle. Such a retaining apparatus may be designed in the style of folding wedges, for example, which deploy themselves and form a wedge shape, provided that the vehicle wheels of the motor vehicle drive over them, and thereby fix the vehicle. In this case, the retaining device is used primarily for fixing the motor vehicle during the charging operation.

Expediently, each charging apparatus has four rollers provided, at least two of which are drivable. It goes without saying that a charging apparatus having just two rollers is also conceivable, in which case each roller has just one contact edge becoming connected to the motor vehicle wheel that is to be driven. If, by contrast, four rollers per charging apparatus are provided, each vehicle wheel is assigned two rollers, with the result that the associated vehicle wheel can be driven solely by the two rollers and can simultaneously be fixed by means of its parking brake, for example. In this case, it is conceivable for either all rollers to be driven by means of a corresponding drive device or else just one respective roller per vehicle wheel. Naturally, it is also possible to have charging apparatuses with eight rollers, at least four of which are drivable, particularly for four-wheel-drive motor vehicles.

Further important features and advantages of the invention emerge from the subclaims, from the drawing and from the associated description of the figures with reference to the drawing.

It goes without saying that the features cited above and the features yet to be explained below can be used not only in the respectively indicated combination but also in other combinations or on their own without departing from the scope of the present invention.

A preferred exemplary embodiment of the invention is shown in the drawing and is explained in more detail in the description below.

BRIEF DESCRIPTION OF THE DRAWINGS

The single FIG. 1 shows a charging apparatus according to the invention.

DETAILED DESCRIPTION OF THE PREFERRED EMBODIMENT

It accordance with FIG. 1, a charging apparatus 1 according to the invention has drivable rollers 2 which have a drive connection to vehicle wheels 3 on an axle of a motor vehicle 4 that is parked thereon. The driven rollers 2 of the charging apparatus 1 drive the vehicle wheel 3 that is connected to the driven rollers 2 so as to transmit force during charging, and thereby drive a generator—not denoted in more detail—or an electric motor in the motor vehicle 4 that is in the form of a generator. In general, the motor vehicle 4 may also be in the form of a hybrid or electric vehicle, and in the latter case the electric motor that is used for drive purposes during travel is used as a generator during charging.

Furthermore, a sensing/control device 5 may be provided which senses a maximum regenerative power for the generator or for the electric motor operating as a generator and present state variables for the electrical energy store, such as particularly the charge state thereof, and actuates or regulates a drive device for driving the rollers 2, while observing present limit values for the electrical energy store in the motor vehicle 4, such that said drive device drives the rollers 2 in accordance with the maximum regenerative power of the generator or the electric motor. The reason is that each generator or each electric motor acting as a generator has a range for an optimum regenerative power, for example an optimum regenerative rotation speed, with the result that operation of the generator or the electric motor in its optimum regenerative range is of great advantage for fast and effective charging of the energy store in the motor vehicle 4.

In general, the charging apparatus 1 may also have a retaining device for fixing the motor vehicle 4 during charging. It is naturally also possible for the motor vehicle 4 to be fixed by means of a parking brake therein. In addition, the driven rollers 2 are preferably profiled in order to be able to ensure the best possible transmission of force to the vehicle wheels 3.

In the case of the example shown in FIG. 1, each vehicle wheel 3 has two rollers 2 provided, at least one of which is driven, and it is also conceivable, in principle, for each vehicle wheel 3 to have just a single driven roller 2 provided. However, the provision of two rollers 2 per vehicle wheel 3 affords the great advantage that the vehicle wheel and hence the motor vehicle 4 stand securely in the hollow formed by the two rollers 2.

In order to charge the energy store in the motor vehicle 4, the latter simply has the relevant vehicle wheels 3 driven onto the rollers 2 of the charging apparatus 1, and the rollers 2 are driven and, as a result, the energy store in the motor vehicle 4 is charged by the generator or an electric motor in the motor vehicle that operates as a generator. A particular advantage of the charging apparatus 1 according to the invention is that it can be used universally and flexibly for almost all hybrid and electric vehicles without the need for special and, in particular, individual customizations for individual vehicle types.

The invention claimed is:

1. A charging apparatus comprising:
    a parking surface;
    at least one pair of rollers accessible at the parking surface for supporting at least one wheel of the vehicle, at least one of the rollers in the at least one pair being drivable for rotating at least one of the vehicle wheels on one axle of an electric or hybrid vehicle so that an electrical energy store in the vehicle is charged by means of its generator or an electric motor in the motor vehicle that is in the form of a generator, the generator having an optimum regenerative rotation speed at which a length of time for fully charging the electrical energy store is minimized; and
    a control device that is configured: to identify a vehicle type for the vehicle at the parking surface, to determine the optimum regenerative rotation speed of the generator or the electric motor of the vehicle at the parking surface and to determine limit values of the energy store of the vehicle at the parking surface based on the identified vehicle type, to observe present values of the energy store of the vehicle at the parking surface, and to cause the at least one drivable roller to rotate the at least one vehicle wheel at the optimum regenerative rotation speed of the generator or the electric motor for so long as present values of the energy store as observed by the control device are within the limit values for the energy store for the vehicle type as identified by the control device.

2. The charging apparatus of claim 1, wherein the charging apparatus has a retaining device for fixing the motor vehicle during charging.

3. The charging apparatus of claim 1, wherein surfaces of the rollers are profiled for achieving optimum transmission of force to the vehicle wheels.

4. A method for charging an electrical energy store in an electric or hybrid vehicle, comprising:
    positioning the motor vehicle on a parking surface of the charging apparatus such that two of the vehicle wheels on one axle of the vehicle are positioned on two pairs of rollers of the charging apparatus,
    identifying a type of the motor vehicle on the parking surface,
    inferring an optimal regenerative rotation speed of a generator or an electric motor of the vehicle at the parking surface and limit values of the energy store of the vehicle on the parking surface based on the type of the motor vehicle that is identified,
    observing present limit values of the energy store of the motor vehicle at the parking surface,
    driving at least one of the rollers in each of the pairs of rollers to rotate the vehicle wheels of the axle at a speed that rotates the generator or the electric motor at the optimal regenerative rotation speed of the generator or the electric motor of the vehicle at the parking surface for so long as the energy store is within the limit values as inferred for the identified vehicle type so that the energy store in the motor vehicle parked thereon is charged at an optimum rate by means of its generator or an electric motor in the form of a generator without exceeding the limit values of the energy store.

5. The method of claim 4, further comprising deploying a retaining device for fixing the motor vehicle on the rollers prior to driving the rollers.

* * * * *